UNITED STATES PATENT OFFICE.

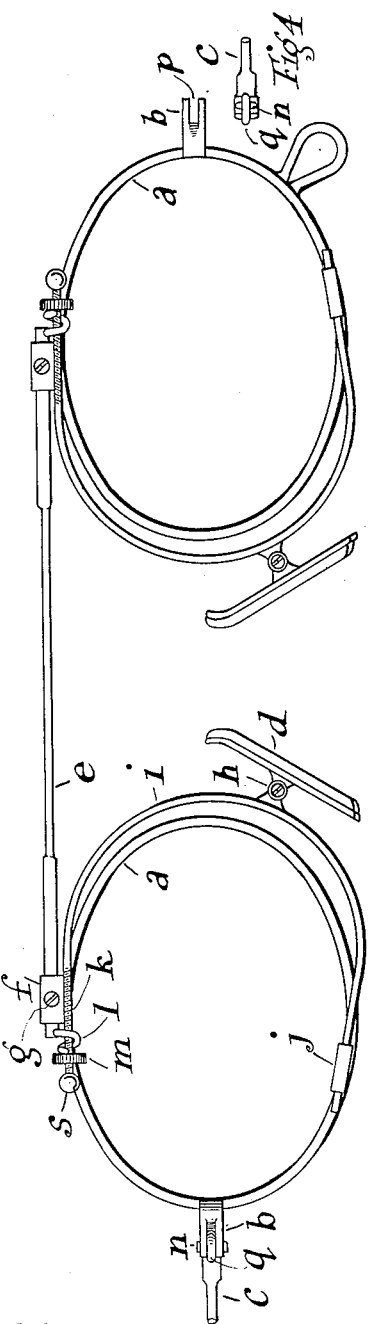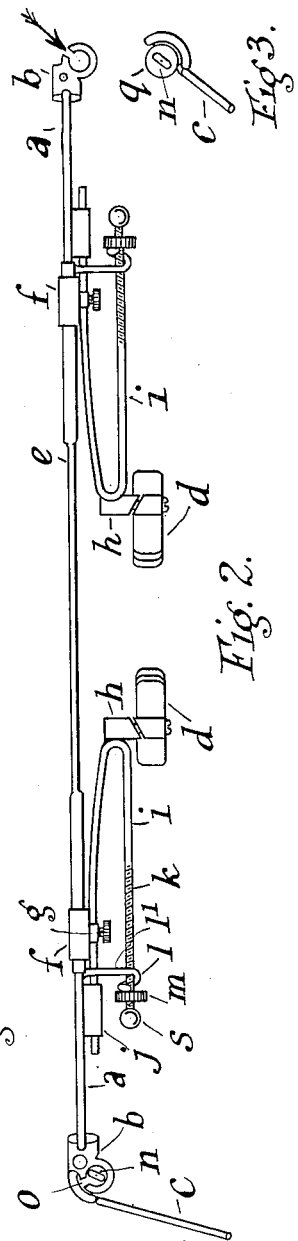

HENRY PEYTON FROST, OF PERTH, WESTERN AUSTRALIA, AUSTRALIA.

SPECTACLE AND PINCE-NEZ FRAME.

932,978.

Specification of Letters Patent. Patented Aug. 31, 1909.

Application filed November 24, 1908. Serial No. 464,249.

*To all whom it may concern:*

Be it known that I, HENRY PEYTON FROST, a subject of the King of Great Britain and Ireland, &c., residing at Perth, in the State of Western Australia, Commonwealth of Australia, have invented certain new and useful Improvements in and Relating to Spectacle and Pince-Nez Frames; and I do hereby declare the following to be a full, clear, and exact description of the invention, such as will enable others skilled in the art to which it appertains to make and use the same.

This invention relates to a construction whereby a pair of spectacles may be readily converted without using tools, into pince-nez, or the latter into spectacles, by the owner at will from time to time. This convenience not only saves expense, but enables avoidance of the trouble of having to carry the separate articles.

A pair of spectacles is so fitted that its sides can be removed when placed in a predetermined position, and by a further adjustment of parts the article becomes a convenient pince-nez. It is often the case that persons prefer spectacles during business hours, but prefer pince-nez at other times. It is found that persons using one or other of two pairs of glasses are apt to do injury to the eye-sight, because of differences in their pupilary distances. With the present invention this evil is obviated, the pupilage being uniform.

My invention comprises the construction illustrated in the drawings herewith, in which—

Figure 1 is a front elevation; and Fig. 2 a plan view of Fig. 1. Figs. 3 and 4 show details in side and plan view respectively. Fig. 5 shows a side view of part of a lens frame in cross-section, with an attached bow-holding eye.

In these drawings the frames of the lenses are marked $a$.

$b$ are ears for holding the sides.

$c$ are the temples of any suitable kind such as those with either straight or curled ends. They have circular plates $q$ to enter recesses, channels, or bifurcations $p$ in the ears.

$d$ are plackets.

$e$ is the bar connecting frames $a$.

Suitable means for securing the proper distance between the lenses are used, as sleeves or cells $f$ in which bar $e$ is slidable, being secured by screws $g$.

The plackets are suitably secured by pivots $h$ to bow springs $i$ one end of each spring being inserted in a sleeve or socket $j$, the other end having a screw thread $k$, and passing through an eye $l$ on a stem $l^1$ projecting from frame $a$. Bows $i$ may have fixed or removable enlargements or end knobs $s$, that may screw on and off. To facilitate removal of bows $i$ (as to make repairs or refit parts) the bow-holding eyes $l$ are slotted or have each a gap through which the bow can be passed, but which will not allow the bow to unship by accident. The eye is conveniently made with the gap enlargeable, and reducible as by pliers.

$m$ is a nut engaging the screw thread $k$ and adapted when set to regulate by its pressure on eye $l$ the position of the spring bow. Temples $c$ are provided with lugs $n$ of any suitable form, and ears $b$ have circular recesses or side sockets with narrow entrances $o$. When a side $c$ is held as in Fig. 3 obliquely relatively to Fig. 2, the socket engaging lug $n$ can be introduced or slipped into entrance $o$ by moving it in the direction shown by an arrow. When the temple $c$ is then swung, either to close the side against the frame, or to open it sufficiently wide to allow a person to put the spectacles on, as shown in Fig. 2 the temple will be secure, and free from tendency to disengagement, the width of lug $n$ being such as to cause a neat fit within the circular recess at each side of the ear.

By adjusting the nut $m$, and so altering the tension of the bows $i$, the distance between the plackets is also regulated, to secure a suitable pince-nez grip by them upon the nose. When the article is used as a pair of spectacles, nuts $m$ are so adjusted that the plackets do not grip firmly as in pince-nez, but are merely located at the nose sides as loosely as convenient. The spring bows are also adjusted by being pushed more or less into sleeves $j$ to suit the wearer. These sleeves are tightened upon bows $i$ by pliers, or are made to grip in other suitable way.

The invention is applicable to lenses without lens frames $a$, by having attachments to the lenses where required, as will be well understood.

Some minor details of the construction may obviously be modified while retaining what I claim.

What I claim as my invention and desire to secure by Letters Patent of the United States is:—

1. An eyeglass frame of the character described, comprising a bar connecting the two lenses, and a spring bow carrying a placket and adjustably connected to each lens, substantially as described.

2. An eyeglass frame of the character described, comprising an inclosing frame for each lens, a bar connecting the two lens frames together, means for adjusting the position of the lens frames relative to each other on said bar, and spring bows carrying plackets adjustably connected to said lens frames, substantially as described.

3. An eyeglass frame of the character described, comprising an inclosing frame for each lens, a bar connecting the two lens frames together, means for adjusting the position of the lens frames relative to each other on said bar, spring bows having one end screw-threaded adjustably connected to said lens frames, a nut mounted on said screw-threaded end of the spring bow for adjusting same, and a placket connected to each spring bow, substantially as described.

In witness whereof I have hereunto set my hand in the presence of two witnesses.

HENRY PEYTON FROST.

Witnesses:
JAMES HODGES,
ANNIE GIBBNEY.